United States Patent [19]

Wada

[11] Patent Number: 5,528,378
[45] Date of Patent: Jun. 18, 1996

[54] ELECTROPHOTOGRAPHIC PRINTER

[75] Inventor: Koji Wada, Tokyo, Japan

[73] Assignee: NEC Corporation, Tokyo, Japan

[21] Appl. No.: 495,707

[22] Filed: Jun. 27, 1995

[30] Foreign Application Priority Data

Jun. 28, 1994 [JP] Japan .................................. 6-169052

[51] Int. Cl.$^6$ ............................ H04N 1/23; H04N 1/393; G06F 15/00; G06K 1/00
[52] U.S. Cl. ........................ 358/300; 358/451; 395/102
[58] Field of Search ................................... 358/300, 451; 382/298, 299; 395/102

[56] References Cited

FOREIGN PATENT DOCUMENTS 1-171946  7/1989  Japan .

Primary Examiner—Peter S. Wong
Assistant Examiner—Gregory J. Toatley, Jr.
Attorney, Agent, or Firm—Foley & Lardner

[57] ABSTRACT

An electrophotographic printer which can print an enlarged image which maintains the concentration of an original image and is superior in maintenance of a line width or a periodical pattern is disclosed. A controller successively outputs each two adjacent horizontal lines of an original image scanned vertically individually as picture element signals. An image enlargement circuit produces an insertion picture element signal indicating an average of the two picture element signals from the controller and outputs an enlargement picture element signal obtained by inserting the insertion picture element signal between the two picture element signals. An engine prints the original image but in an enlarged scale in accordance with the enlargement picture element signal received from the image enlargement circuit.

3 Claims, 8 Drawing Sheets

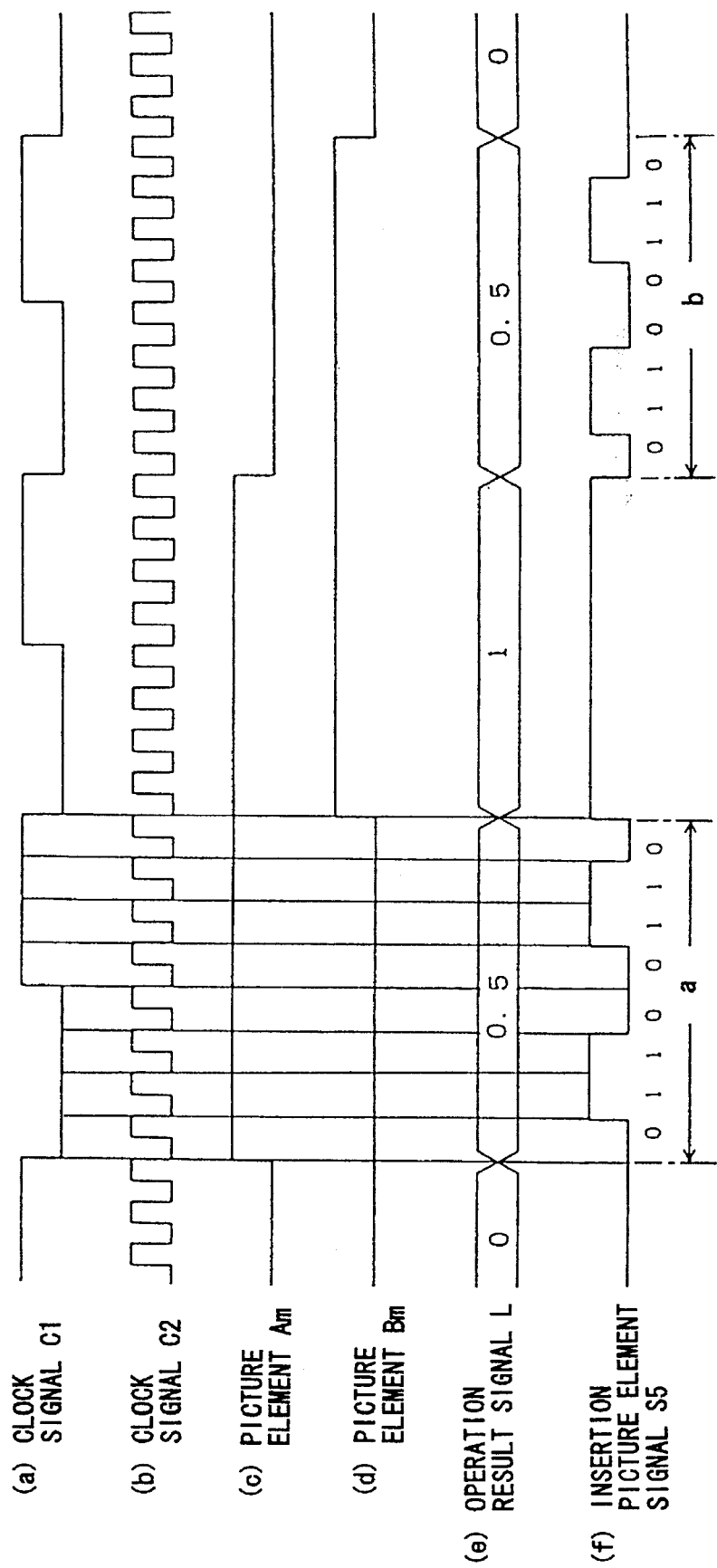

2N+1
2N+2

3L+1
3L+2
3L+3

ELECTROPHOTOGRAPHIC PRINTER

BACKGROUND OF THE INVENTION

1. Field of the Invention

This invention relates to an electrophotographic printer, and more particularly to an electrophotographic printer which employs an improved image processing technique of printing an image produced by a controller with a resolution increased to 1.5 times.

2. Description of the Related Art

An electrophotographic printer of the type mentioned is disclosed, for example, in Japanese Patent Laid-Open Application No. Heisei 1-171946. In the prior art electrophotographic printer, the frequency of a reference clock signal for write data is varied to adjust the size of an image of the write data.

FIG. 8 shows a block diagram of an electrophotographic printer of the type just mentioned. Referring to FIG. 8, an image picture signal from a controller 100 is temporarily stored into a shift register 102, from which it is read out later in accordance with a period of pulses from a clock frequency division circuit 103 and supplied to an engine 101. When the ratio between the image resolution of the controller 100 and the printing resolution of the engine 101 is 2:3, in order to lower the transfer frequency for the picture element signal in regard to a main scanning direction which is a scanning direction of a beam of light to ⅔ times, the clock signal from the controller 100 is frequency divided to ⅔ times by the clock frequency division circuit 103, and with regard to a sub scanning direction perpendicular to the main scanning direction, same data as those of the last line are outputted at the rate of one line to two lines.

Further, for the sub scanning direction, also another method for producing output data has been proposed wherein picture elements of a line to be inserted are produced by logical ORing or logical ANDing of picture elements of the last line and the following next line.

The prior art electrophotographic printer is disadvantageous in the following points.

In order to enlarge image data in the sub scanning direction to 1.5 times, an artificial line is inserted at the rate of one line to two lines. In order to produce picture elements of the line to be inserted, one of a method of duplicating picture elements of the last line (the method will be hereinafter referred to as "duplication method"), another method of logically ORing picture elements of the last line and the following next line (the method will be hereinafter referred to as "logical ORing method") and a further method of logically ANDing picture elements of the last line and the following next line (the method will be hereinafter referred to as "logical ANDing method") is employed.

However, whichever one of those methods is employed, since picture elements to be inserted are black or white in units of a picture element, the enlarged image exhibits striking irregularity in regard to line width or cyclical repetitions of a pattern.

FIGS. 6(a) to 6(d) and 7(a) to 7(d) show original images and enlarged images of them. In particular, FIGS. 6(a) and 7(a) show original images; FIGS. 6(b) and 7(b) show enlarged images obtained by enlargement of the original images by the duplication method; FIGS. 6(c) and 7(c) show enlarged images obtained by the logical ORing method; and FIGS. 6(d) and 7(d) show enlarged images obtained by the logical ANDing method. As can be seen from those figures, those methods are peculiarly disadvantageous in that the duplication method is inferior in reproducibility of a thin line; according to the logical ORing method, an enlarged image exhibits an increase in concentration, and a character or an image is liable to collapse; and according to the logical ANDing method, an enlarged image exhibits a decrease in concentration, and the continuity of a line is liable to be damaged.

SUMMARY OF THE INVENTION

It is an object of the present invention to provide an electrophotographic printer which can print an enlarged image which maintains the concentration of an original image and is superior in maintenance of a line width or a periodical pattern.

In order to attain the object described above, according to the present invention, there is provided an electrophotographic printer, comprising a controller for successively outputting each set of first and second adjacent horizontal lines from among a plurality of horizontal lines obtained by scanning an original image individually as binary digitized picture element signals, an image enlargement circuit for producing an insertion picture element signal indicating averages of data of each set of first and second picture element signals from the controller and outputting an enlargement picture element signal obtained by inserting the insertion picture element signal between the first and second picture element signals, and an engine for printing an image in accordance with the enlargement picture element signal from the image enlargement circuit.

The image enlargement circuit may include an arithmetic operation circuit for calculating averages of data of the picture element signal of the first line and data of the picture element signal of the second line and outputting an operation result signal representing a result of the calculation, a modulation circuit for outputting an insertion picture element signal modulated so as to have a waveform corresponding to the operation result signal from the arithmetic operation circuit, and an output order control circuit for outputting the image signal of the first line, the insertion picture element signal and the picture element signal of the second line in this order to the engine.

The image enlargement circuit may further include a clock generation circuit for generating a first clock signal for transferring the picture element signal from the controller and a second clock signal having a frequency equal to α times the frequency of the first clock signal, α being an integral number, and an α-bit register whose bits can be set from the controller. In this instance, the modulation circuit may be constructed so as to divide each picture element having a value of "0.5" from within the operation result signal from the arithmetic operation circuit into α in response to the second clock signal and form a waveform of the picture element having the value of "0.5" in accordance with set bits of the register in synchronism with the first clock signal.

In the electrophotographic printer, a pair of upper and lower horizontal lines of an original image are binary digitized by the controller and successively outputted as picture element signals to the image enlargement circuit. Then, in the image enlargement circuit, an insertion picture element signal representing an average of the picture element signals of the upper and lower horizontal lines is produced and inserted between the picture element signals of the upper and lower horizontal lines to form an enlargement picture element signal. The enlargement picture element signal is outputted from the image enlargement circuit to the engine. Then, in the engine, an image is printed in accordance with the enlargement picture element signal.

With the electrophotographic printer, since an insertion picture element signal representing an average of upper and lower picture element signals of an original image is produced by the image enlargement circuit and inserted between the upper and lower picture element signals to form an enlargement picture element signal and the enlargement picture element signal thus formed is outputted to the engine, a picture element in units of a substantially one half picture element can be inserted between a pair of upper and lower picture elements. Consequently, reproducibility of a thin line can be assured and an appropriate concentration can be obtained. As a result, the electrophotographic printer is advantageous in that it can print an enlarged image which maintains the concentration of an original image and is superior in maintenance in line width and a periodical pattern of the original image.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 4 is a time chart illustrating operation of an arithmetic operation circuit and a modulation circuit of the image enlargement circuit shown in FIG. 2 and wherein the waveforms (a) and (b) show clock signals, the waveforms (c) and (d) show picture elements, the waveform (e) shows an arithmetic operation result signal, and the waveform (f) shows an insertion picture element signal;

FIGS. 6(a) to 6(e) are diagrammatic views illustrating an original image and enlarged images obtained from the original data and wherein FIG. 6(a) shows the original image, FIG. 6(b) shows an enlarged image of the original image enlarged by the duplication method, FIG. 6(c) shows an enlarged image by the logical ORing method, FIG. 6(d) shows an enlarged image by the logical ANDing method, and FIG. 6(e) shows an enlarged image obtained by the electrophotographic printer shown in FIG. 1;

FIGS. 7(a) to 7(e) are diagrammatic views illustrating another original image and enlarged images obtained from the original image and wherein FIG. 7(a) shows the original image, FIG. 7(b) shows an enlarged image of the original image enlarged by the duplication method, FIG. 7(c) shows an enlarged image by the logical ORing method, FIG. 7(d) shows an enlarged image by the logical ANDing method, and FIG. 7(e) shows an enlarged image obtained by the electrophotographic printer shown in FIG. 1.

DESCRIPTION OF THE PREFERRED EMBODIMENT

Figure 1:
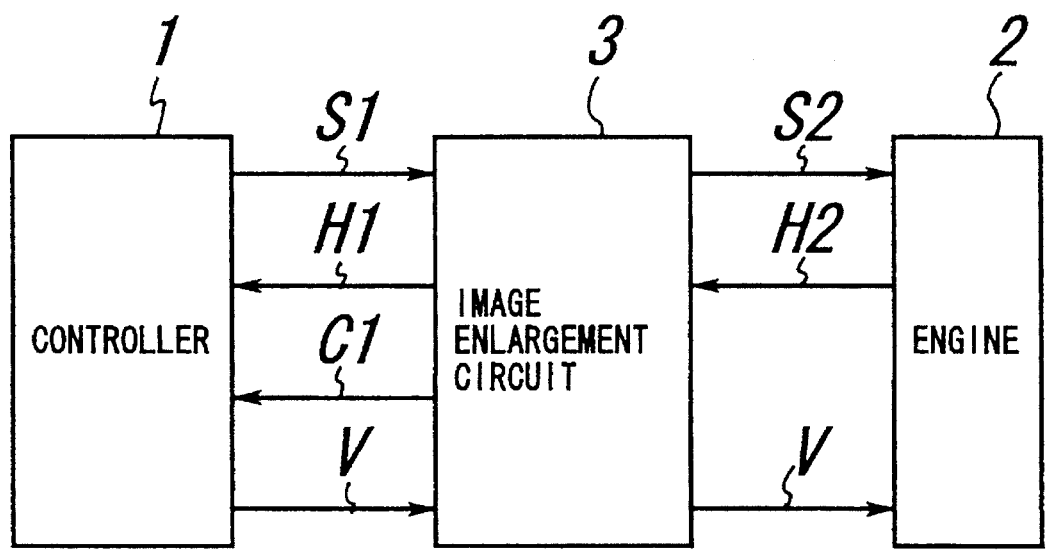
FIG. 1 is a block diagram of an electrophotographic printer showing a preferred embodiment of the present invention.

Referring first to FIG. 1, there is shown in block diagram an electrophotographic printer according to a preferred embodiment of the present invention. The electrophotographic printer shown includes a controller 1, an engine 2, and an image enlargement circuit 3 interposed between the controller 1 and the engine 2. A picture element signal S1 and a vertical synchronizing signal V are supplied from the controller 1 to the image enlargement circuit 3; a horizontal synchronizing signal H1 and a clock signal C1 are supplied from the image enlargement circuit 3 to the controller 1; an enlargement picture element signal S2 and the vertical synchronizing signal V are supplied from the image enlargement circuit 3 to the engine 2; and another horizontal synchronizing signal H2 is supplied from the engine 2 to the image enlargement circuit 3.

Figure 2:
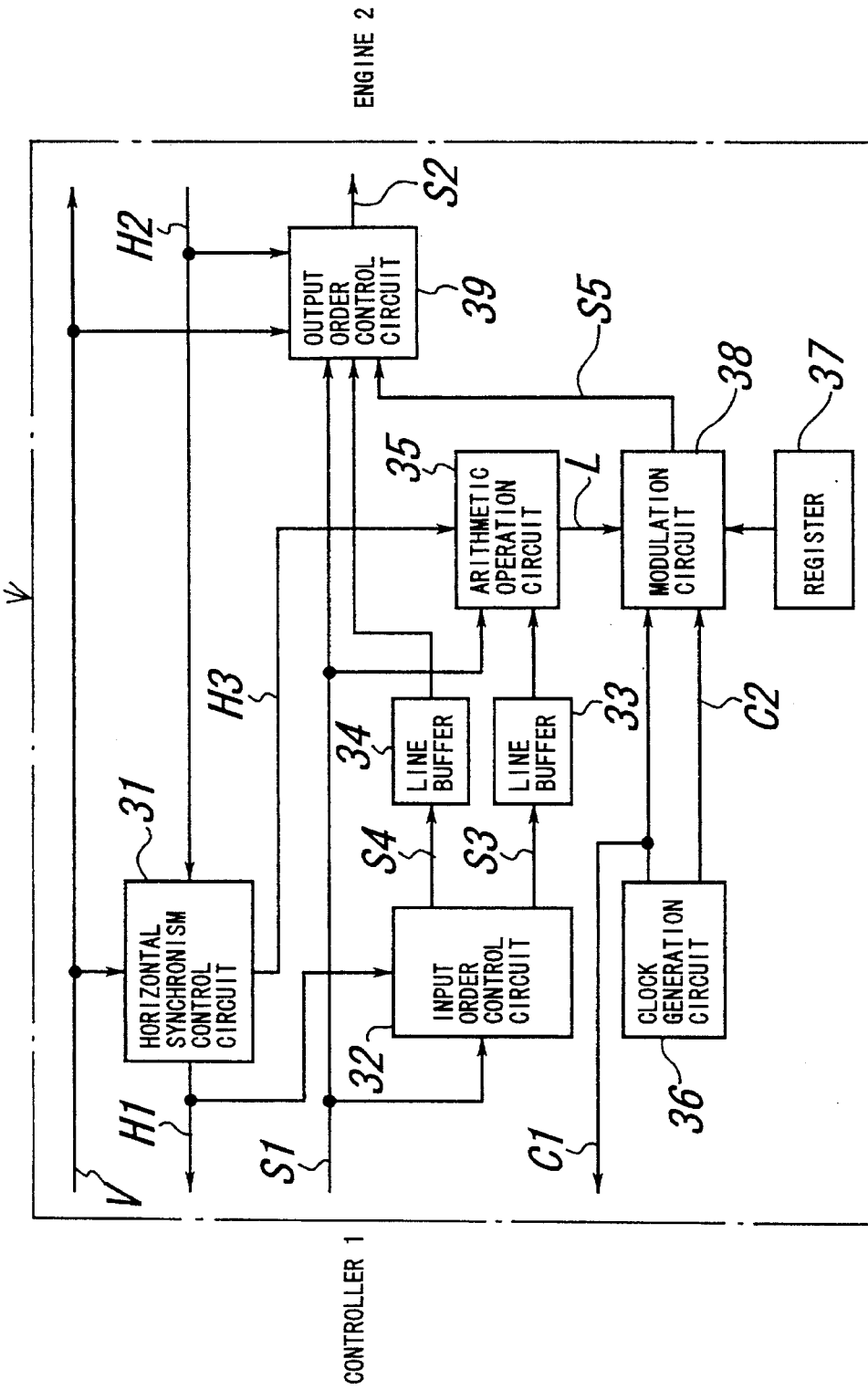
FIG. 2 is a block diagram showing an image enlargement circuit of the electrophotographic printer shown in FIG. 1.

Referring now to FIG. 2, the image enlargement circuit 3 includes a horizontal synchronism control circuit 31, an input order control circuit 32, a pair of line buffers 33 and 84, an arithmetic operation circuit 35, a clock generation circuit 36, a register 37, a modulation circuit 38, and an output order control circuit 39.

The horizontal synchronism control circuit 31 outputs a horizontal synchronizing signal H1 to the controller 1 in response to a horizontal synchronizing signal H2 from the engine 2. More particularly, as seen from the waveforms (b) and (c) of FIG. 3, the horizontal synchronism control circuit 31 outputs a horizontal synchronizing signal H1 to the controller 1 when the horizontal synchronizing signal H2 inputted thereto from the engine 2 is for the 3L+1th (L=integral number) line or the 3L+2th line. However, the horizontal synchronism control circuit 31 does not output the horizontal synchronizing signal H1 when the horizontal synchronizing signal H2 for the 3L+3th line is inputted. In short, while the enlargement picture element signal S2 for each three lines is outputted to the engine 2, the picture element signal S1 for each two lines is inputted from the controller 1.

Figure 3:
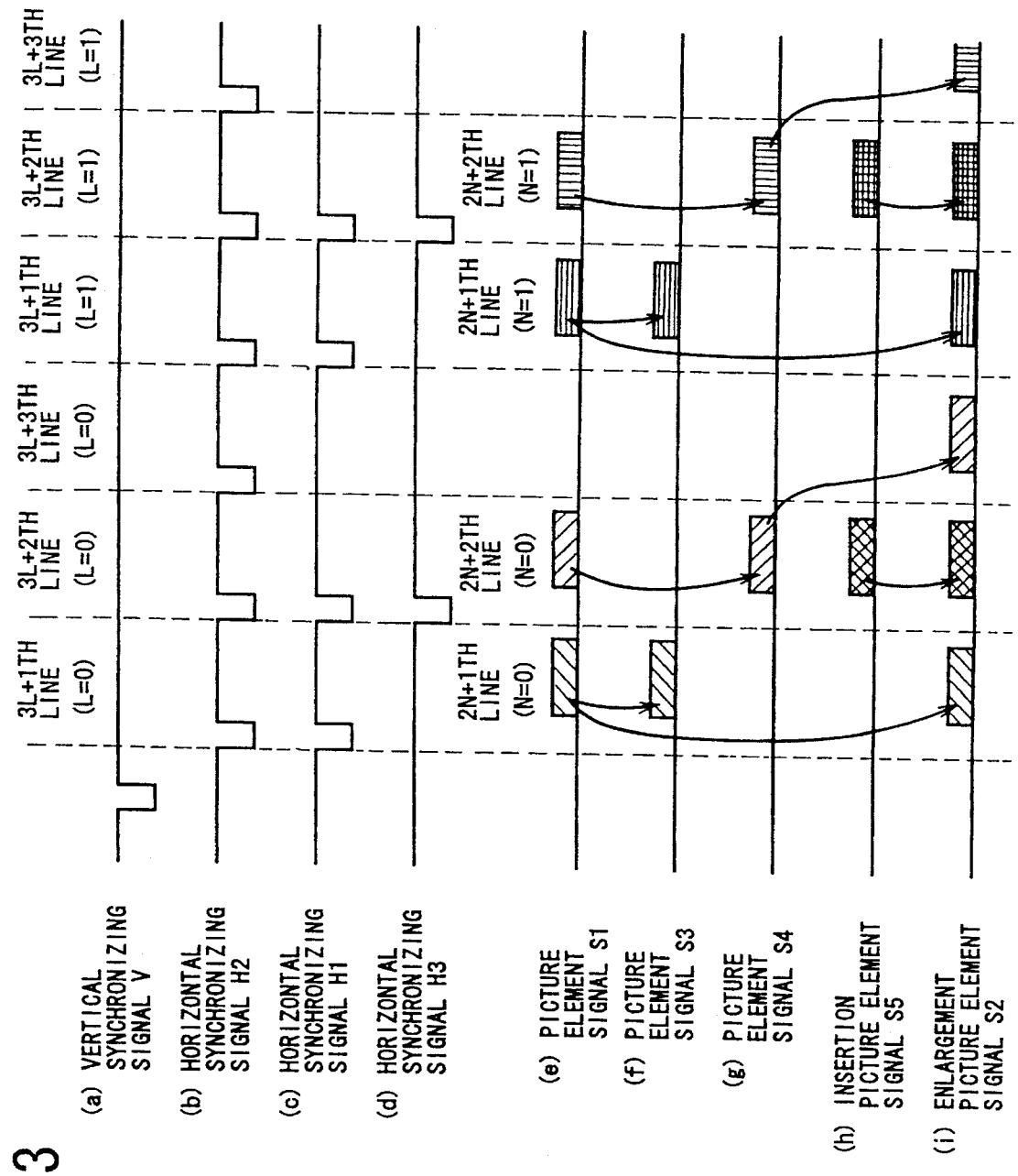
FIG. 3 is a time chart of signals of the image enlargement circuit shown in FIG. 2 and wherein the waveform (a) shows a vertical synchronizing signal, the waveforms (b) to (d) show horizontal synchronizing. signals, and the waveforms (e) to (i) show picture element signals.

The horizontal synchronism control circuit 31 also has another function of extracting the horizontal synchronizing signal H2 outputted from the engine 2 only for the 3L+2th line and outputting it as a horizontal synchronizing signal H3 to the arithmetic operation circuit 35 as seen from the waveform (d) of FIG. 3.

It is to be noted that, as seen from the waveform (a) of FIG. 3, for what numbered line the horizontal synchronizing signal H2 is is determined using the vertical synchronizing signal V outputted from the controller 1 as an initialization signal.

The input order control circuit 32 successively inputs, as seen from the waveforms (e), (f) and (g) of FIG. 3, a picture element signal S3 of the 2N+1th (N=integral number) line from within the picture element signal S1 outputted from the controller 1 into the line buffer 33 and inputs another picture element signal S4 for the 2N+2the line into the line buffer 34.

It is to be noted that changing over between the picture element signal S3 and the picture element signal S4 of the picture element signal S1 is performed in response to the horizontal synchronizing signal H1 outputted from the horizontal synchronism control circuit 31.

The line buffers 33 and 34 are FIFO memories having a necessary and sufficient capacity to store the picture element signal S1 for one line in the main scanning direction outputted from the controller 1.

The arithmetic operation circuit 35 calculates, as shown in waveform (h), an average of a picture element signal from the line buffer 33 and another picture element signal of the next following line.

When the horizontal synchronizing signal H2 at a 3L+1th line is input, the output order control circuit 39 outputs the picture element signal S1 at a 2N+1th line output from the controller 1 as it is as enlargement picture element signal S2 to the engine 2. When the horizontal synchronizing signal H2 at a 3L+2th line is input, the insertion picture element signal S5 produced from the picture element signal S3 and the picture element signal S4 by the modulation circuit 38, that is, produced from the picture element signal S1 at the 2N+1th line and the 2N+2th line, is output as enlargement picture element signal S2 to the engine 2. When the horizontal synchronizing signal H2 at the 3L+3th line is input, the line buffer 34 is successively read out so that the picture element signal S4 stored in the line buffer 34, that is, the picture element signal S1 at the 2N+2th lines, is output as enlargement picture element signal S2 to the engine 2. In other words, the enlargement picture element signal S2 at a 3L+1th line is equal to the picture element signal S1 at a 2N+1th line output from the controller 1; the enlargement picture element signal S2 at a 3L+2th line is equal to the picture element signal S5 produced by the modulation circuit 38 from the picture element signals S1 at the 2N+1th line and the 2N+2th line output from the controller 1; and the enlargement picture element signal S2 at a 3L+3th line is equal to the picture element signal S1 at the 2N+2th line output from the controller 1. In this manner, the enlargement picture element signal S2 illustrated in (i) of FIG. 3 has a form wherein the insertion picture element signal S5 shown by the waveform (h) in FIG. 3 is inserted for one line between the picture element signal S1 at the 2N+1th lines and picture element signal S1 at the 2N+2th lines output from the controller 1. Thus, the enlargement picture element signal S2 includes repetitions of the picture element signal S1 at a 2N+1th line, an insertion picture element signal S5 produced from the picture element signal S1 at the 2N+1th line and a next 2N+2th line, and the picture element signal S1 at a next 2N+2th line.

The waveforms (c) to (e) of FIG. 4 illustrate operation of the arithmetic operation circuit 35. The arithmetic operation circuit 35 successively reads out stored data of the line buffer 33 using an input of the horizontal synchronizing signal H3 for the 3L+2th line as a trigger signal. Then, the arithmetic operation circuit 35 performs an arithmetic operation of (Am+Bm)/2 from an mth picture element Am of the 2N+1th line stored in the line buffer 33 and an mth picture element Bm of the 2N+2th line currently outputted from the controller 1. Since the values which can be assumed by the picture element Am and the picture element Bm are "0" or "1" as seen from the waveforms (c) and (d) of FIG. 4, an operation result signal L assumes one of "0", "1" and "0.5" as seen from the waveform (e) of FIG. 3.

The clock generation circuit 36 generates a clock signal C1 (first clock signal) for the picture element signal S1 outputted from the controller 1 and another clock signal C2 (second clock signal) having a frequency equal to α (integral number) times that of the clock signal C1. The clock generation circuit 36 outputs the clock signal C1 to the controller 1 and outputs the clock signals C1 and C2 to the modulation circuit 38.

It is to be noted that the clock signal C1 has only a frequency equal to ⅔ times the transfer frequency for the enlargement picture element signal S2 demanded by the engine 2.

The register 37 is an α-bit register whose any bit can be set from the controller 1. For example, α is equal to 8, and the register 37 has data "01100110" set therein. The thus set data "01100110" is a signal pattern for causing white and black to be recorded individually by 50% in one picture element. The signal pattern depends upon a characteristic of a photosensitive member employed in the engine 2, and is actually determined experimentally.

The modulation circuit 38 outputs an insertion picture element signal S5 having a waveform corresponding to the operation result signal L from the arithmetic operation circuit 35. More particularly, as seen from the waveforms (e) and (f) of FIG. 4, when the operation result signal L is "0" or "1", the modulation circuit 38 outputs the value. In contrast, when the operation result signal L is "0.5", the modulation circuit 38 outputs a signal having a waveform shown at a portion a or b of the waveform (f) of FIG. 4. In particular, the modulation circuit 38 divides one picture element into α (for example, α=8) in response to the clock signal C2 and outputs an insertion picture element signal S5 in accordance with the set data of the register 37 in synchronism with the clock signal C1. If it is assumed that, for example, α=8 and the data "01100110" is set in the register 37, then the signal at the portion a or b of the waveform (f) of FIG. 4 is outputted from the modulation circuit 38.

The output order control circuit 39 outputs, when the horizontal synchronizing signal H2 for the 3L+1th line is inputted thereto, the picture element signal S1 outputted from the controller 1 as it is as the enlargement picture element signal S2 to the engine 2 as seen from FIG. 3. In contrast, when the horizontal synchronizing signal H2 for the 3L+2th line is inputted, the output order control circuit 39 outputs the insertion picture element signal S5 from the modulation circuit 38 as the enlargement picture element signal S2 to the engine 2. Further, when the horizontal synchronizing signal H2 for the 3L+3th line is inputted, the output order control circuit 39 successively reads out stored data of the line buffer 34 and outputs the picture element signal S4 of the 2N+2th line stored in the line buffer 34 as the enlargement picture element signal S2 to the engine 2.

Subsequently, operation of the electrophotographic printer of the present embodiment will be described.

Figure 6A:
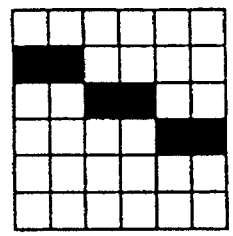
Figure 6B:
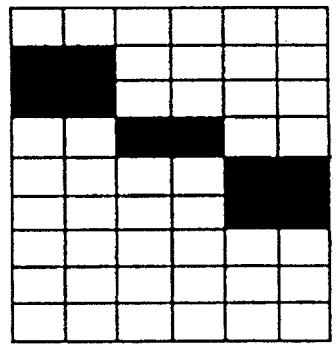
Figure 6C:
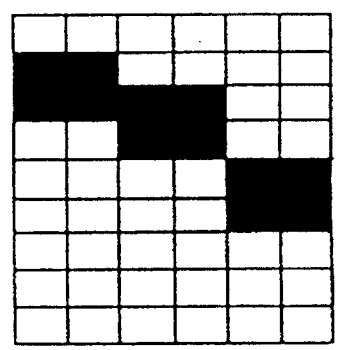
Figure 6D:
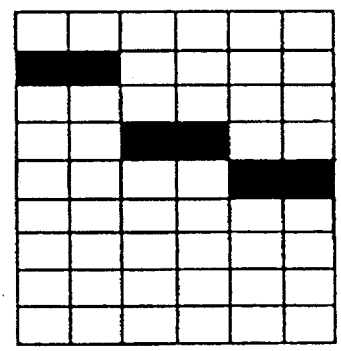
Figure 6E:
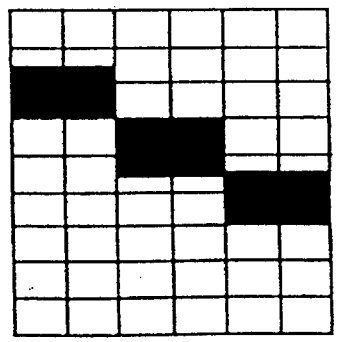
Figure 7A:
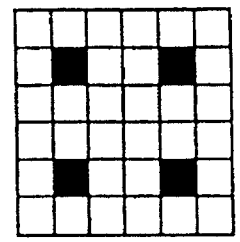
Figure 7B:
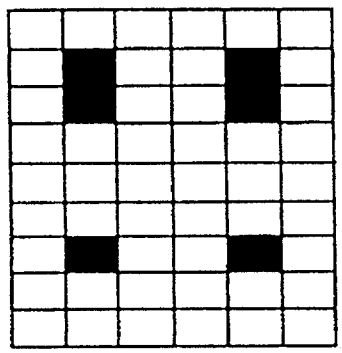
Figure 7C:
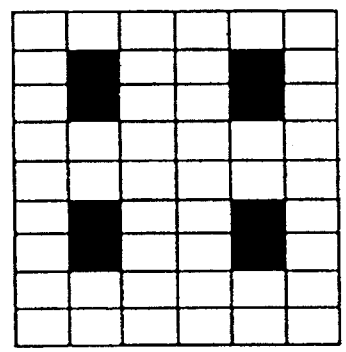
Figure 7D:
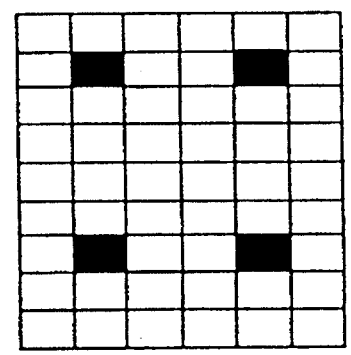
Figure 7E:
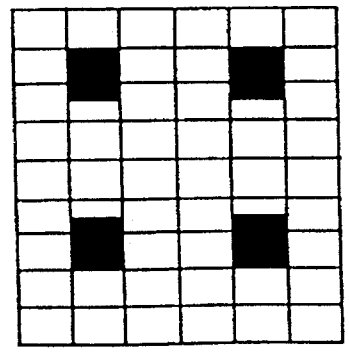
Figure 8:
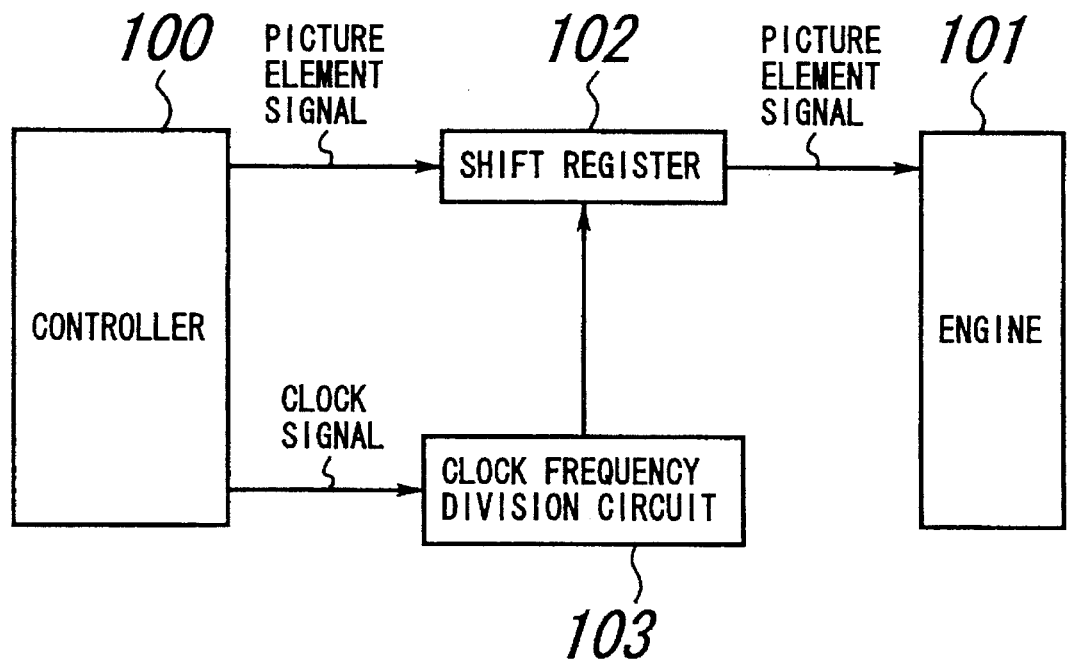
FIG. 8 is a block diagram showing a conventional electrophotographic printer.

FIG. 6(e) shows an image obtained by enlargement of the original image shown in FIG. 6(a) to 1.5 times. When the picture element signal S1 "0, 0, 0, 0, 0, 0" for the first (2N+1th) line and the picture element signal S1 "1, 1, 0, 0, 0, 0" for the second (2N+2th) line are inputted to the input order control circuit 32 in response to the horizontal synchronizing signal H1 as seen in FIG. 6(a), the picture element signal S1 "0, 0, 0, 0, 0, 0" is stored as the picture element signal S3 into the line buffer 33, and the picture element signal S1 "1, 1, 0, 0, 0, 0" is stored as the picture element signal S4 into the line buffer 34. Then, the arithmetic operation circuit 35 successively reads out data of the picture element signal S3 "0, 0, 0, 0, 0, 0" from the line buffer 33 and performs operation of them with data of the picture element signal S1 "1, 1, 0, 0, 0, 0" currently outputted from the controller 1. As a result, an operation result signal L "0.5, 0.5, 0, 0, 0, 0" is outputted from the arithmetic operation circuit 35 to the modulation circuit 38, and an insertion picture element signal S5 "0.5, 0.5, 0, 0, 0, 0" which includes the waveform at the portion a or b of the waveform (f) shown in FIG. 4 is outputted to the output order control circuit 39.

The output order control circuit 39 outputs the picture element signal S1 for the first line outputted from the controller 1 as it is as the enlargement picture element signal S2 "0, 0, 0, 0, 0, 0" to the engine 2. Then, the output order control circuit 39 outputs the insertion picture element signal S5 from the modulation circuit 38 as the enlargement picture element signal S2 "0.5, 0.5, 0, 0, 0, 0" to the engine 2. Thereafter, the output order control circuit 39 successively reads out stored data of the line buffer 34 and outputs the picture element signal S4 for the second line stored in the line buffer 34 as the enlargement picture element signal S2 "1, 1, 0, 0, 0, 0" to the engine 2.

Consequently, the images of the first line and the second line of the waveform (a) of FIG. 6 are successively outputted as "0, 0, 0, 0, 0, 0", "0.5, 0.5, 0, 0, 0, 0" and "1, 1, 0, 0, 0, 0" to the engine 2.

When such enlargement picture element signal S2 of the three lines are inputted to the engine 2, the following printing operation is performed by the engine 2.

First, since the transfer frequency of the enlargement picture element signal S2 to the engine 2 is equal to ⅔ times the transfer frequency demanded by the engine 2, one picture element is printed in an enlarged scale to 1.5 times in the horizontal direction. Though not shown, such enlargement in the horizontal direction is performed by the same technique as is employed in conventional electrophotographic printers.

In contrast, in regard to the vertical direction, since the data for the first (3L+1th) line are "0, 0, 0, 0, 0, 0", the data for the second (3L+2th) line are "0.5, 0.5, 0, 0, 0, 0" and the data for the third (3L+3th) line are "1, 1, 0, 0, 0, 0", they are printed in such a manner as seen from the first to third lines in FIG. 6(e). In other words, the original image is printed in a scaled enlarged to 1.5 times in the vertical direction.

By the way, when light is irradiated upon a photosensitive drum, a maximum potential is exhibited at a central portion of the photosensitive drum, and the potential decreases as the distance from the center of the photosensitive drum increases. Further, a threshold level is present in the sticking amount of toner powder, and whether or not toner powder sticks can be seen comparatively clearly across a certain potential. It is to be noted that the potential is defined as an accumulated potential till then.

Figure 5A:
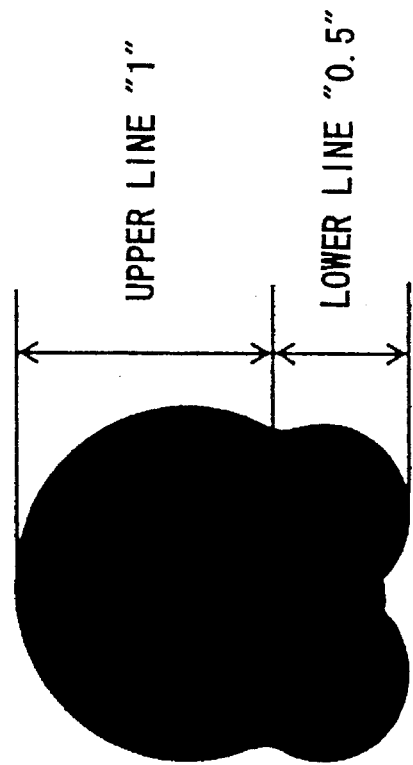
FIG. 5(a) is a diagrammatic view illustrating a toner powder sticking condition by the potential of "1" in the next lower line.
Figure 5B:
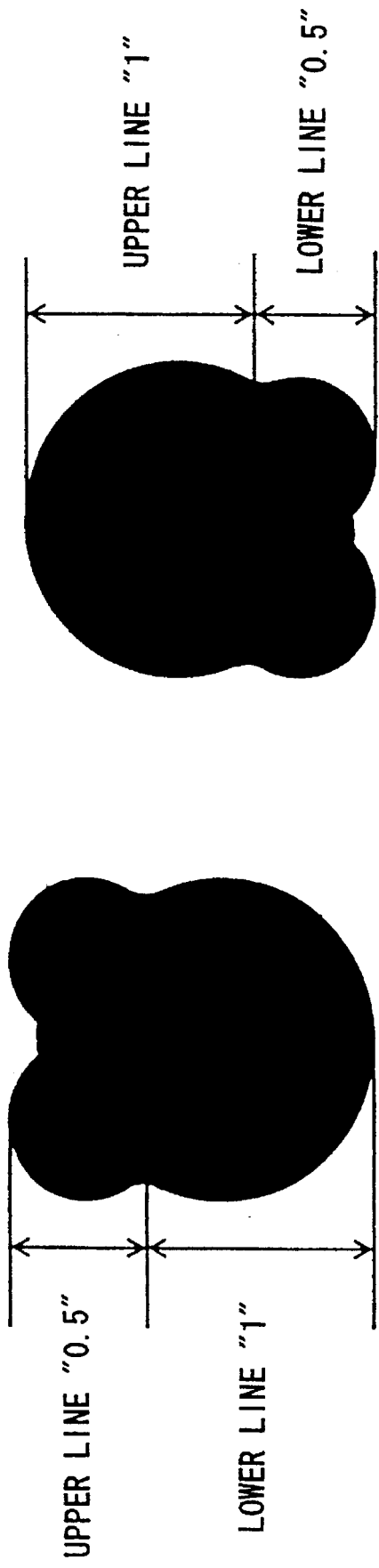
FIG. 5(b) is a similar view but illustrating another toner powder sticking condition by the potential of "1" in the last upper line.

Accordingly, at a potential corresponding to "1" in the third line shown in FIG. 6(e), toner powder sticks positively as seen from a portion c in each of FIGS. 5(a) and 5(b). In contrast, at another lower potential corresponding to "0.5" in the second line shown in FIG. 6(e), toner powder will not stick, and consequently, such a result of printing as seen in FIG. 6(e) cannot be obtained.

However, when the potential corresponding to "1" is produced at that location in a line directly below (or directly above) the second line, which is directly below (or directly above) another location of a picture element in the second line which corresponds to "0.5", toner powder corresponding to "0.5" will stick to the location of the picture element contiguously to toner powder sticking to the location of the potential which corresponds to "1" below or above the location due to a cumulative action of the potential of "1" with the lower potential corresponding to "0.5". As a result, an image enlarged to 1.5 times in the vertical direction is printed as seen in FIG. 6(e).

Similar operation occurs between the third and fourth lines and between the fifth and sixth lines of the original picture, and an enlarged image of the fourth to sixth lines shown in FIG. 6(e) is obtained from the third and fourth lines of the original image whereas an enlarged image of the seventh to ninth lines shown in FIG. 6(e) is obtained from the fifth and sixth lines of the original image.

Having now fully described the invention, it will be apparent to one of ordinary skill in the art that many changes and modifications can be made thereto without departing from the spirit and scope of the invention as set forth herein.

What is claimed is:

1. An electrophotographic printer, comprising:

a controller for successively outputting each set of first and second adjacent horizontal lines from among a plurality of horizontal lines obtained by scanning an original image individually as binary digitized picture element signals;

an image enlargement circuit for producing an insertion picture element signal indicating averages of data of each set of first and second picture element signals from said controller and outputting an enlargement picture element signal obtained by inserting the insertion picture element signal between the first and second picture element signals; and an engine for printing an image in accordance with the enlargement picture element signal from said image enlargement circuit.

2. An electrophotographic printer as claimed in claim 1, wherein said image enlargement circuit includes an arithmetic operation circuit for calculating averages of data of the picture element signal of the first line and data of the picture element signal of the second line and outputting an operation result signal representing a result of the calculation, a modulation circuit for outputting an insertion picture element signal modulated so as to have a waveform corresponding to the operation result signal from said arithmetic operation circuit, and an output order control circuit for outputting the image signal of the first line, the insertion picture element signal and the picture element signal of the second line in this order to said engine.

3. An electrophotographic printer as claimed in claim 2, wherein said image enlargement circuit further includes a clock generation circuit for generating a first clock signal for transferring the picture element signal from said controller and a second clock signal having a frequency equal to α times the frequency of the first clock signal, α being an integral number, and an α-bit register whose bits can be set from said controller, and said modulation circuit divides each picture element having a value of "0.5" from within the operation result signal from said arithmetic operation circuit into α in response to the second clock signal and forms a waveform of the picture element having the value of "0.5" in accordance with set bits of said register in synchronism with the first clock signal.

* * * * *